May 2, 1939. A. DE LOS SINDEN 2,156,878
CONVEYER
Filed Jan. 7, 1937
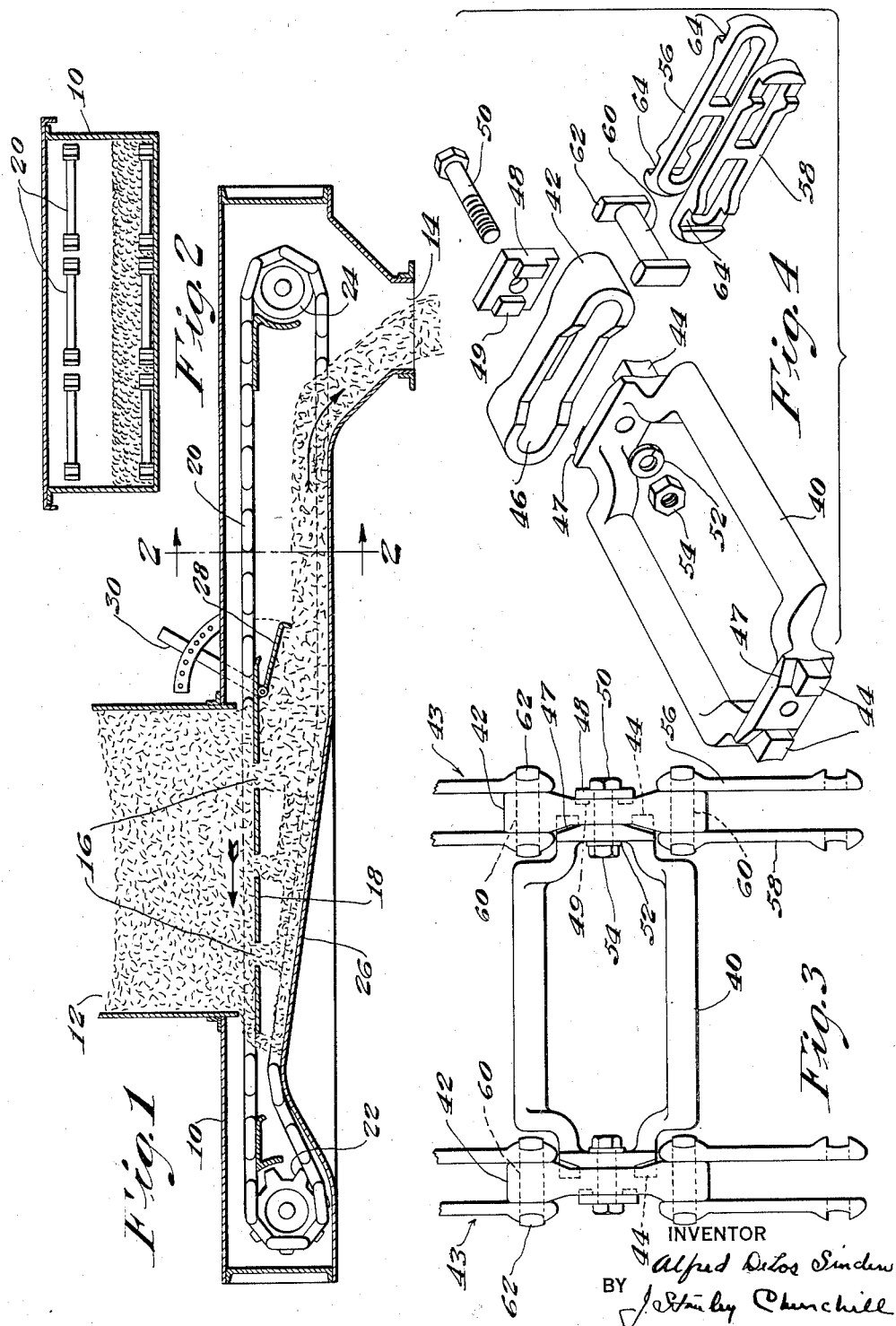
INVENTOR
Alfred DeLos Sinden
BY J. Stanley Churchill.
ATTORNEY Patented May 2, 1939

2,156,878

UNITED STATES PATENT OFFICE 2,156,878

CONVEYER

Alfred De Los Sinden, Aurora, Ill., assignor to Redler Conveyor Company, Quincy, Mass., a corporation of Massachusetts Application January 7, 1937, Serial No. 119,441

8 Claims. (Cl. 198—168)

This invention relates to a conveyer.

One object of the invention is to provide a novel chain-like conveying element which is particularly designed for use in conveying flowable solid material, and the construction of which is such as to enable the component parts of the conveying element to be assembled and replaced in minimum time and with minimum effort.

A further object of the invention is to provide a novel conveyer for use in discharging flowable solid material from a storage bin which is efficient in operation, may be economically manufactured, conveniently repaired, and is of a durable practical construction.

With these general objects in view, and such others as may hereinafter appear, the invention consists in the conveying element and in the conveyer hereinafter described and particularly defined in the claims at the end of this specification.

In the drawing illustrating the preferred embodiment of the invention, Fig. 1 is a longitudinal sectional view of a conveyer for discharging flowable solid material from the bottom of a storage bin and embodying the present invention, Fig. 2 is a cross-sectional detail on the line 2—2 of Fig. 1, Fig. 3 is a plan view illustrating a section of the conveying element used in the conveyer shown in Fig. 1, and Fig. 4 is a perspective view of a section of the conveying element shown detached and illustrating the manner in which the element is assembled with the chain links.

In general, the present invention contemplates a chain-like structure of conveying element which is particularly adapted for use as the conveying element in conveying flowable solid material in a conveyer of the general type forming the subject matter of the Redler Reissue Patent No. 18,445, and the construction of the novel chain-like conveyer element is such as to permit the component parts thereof to be readily assembled and replaced or repaired in minimum time and with minimum effort. In the preferred form of the invention, the component parts of the conveying element are formed in a manner such as to permit them to be assembled without the use of rivets and to function efficiently for the intended purpose. The novel chain-like conveying element is particularly useful when embodied in a structure for discharging flowable solid material from a storage bin.

Referring now to the drawing, the different features of the invention have for purposes of illustration been shown as embodied in a conveyer of the general type illustrated in the Redler Reissue Patent No. 18,445 of April 26, 1932, and in which 10 represents the casing or conduit which is provided with an inlet from a storage bin 12 and an outlet 14. The flowable solid material is arranged to be withdrawn uniformly from the bottom of the bin 12, and in the conveyer illustrated in Fig. 1 the material is arranged to be discharged through slots 16 in a deflecting or supporting plate 18 as it is moved in the direction of the arrow by the upper run of an endless conveyer member 20 arranged to run around sprockets 22, 24, one of which 22 may be driven from any convenient source of power, not shown. The conveyer member 20 is of the open or skeleton flight type capable of conveying the material in a continuous stream. The material is then permitted to fall by gravity onto the bottom wall of the casing 10 where it is conveyed to the outlet 14 by the lower run of the conveyer. The bottom wall 26 of the conveyer casing 10 is preferably arranged to slope downwardly in a direction toward the discharge outlet 14 in order to assist in enabling a gate 28 whose position may be adjusted by a handle 30, to effectively control the conveyance of the material to the discharge outlet 14 in a continuous stream of uniform depth. As illustrated in Fig. 1, during operation the position of the casing 10 immediately behind the gate 28 and beneath the deflecting plate 18 is filled with material constituting a bulk supply thereof so that the lower run of the conveyer may at all times withdraw a uniform depth of the material from under the gate 28, irrespective of the adjusted position of the gate.

In the preferred embodiment of the invention, the conveying element 20 comprises a plurality of duplicate units detachably connected together to form the complete conveying element. As shown in Figs. 3 and 4, each unit comprises a transverse member 40 of open structure arranged to be connected to two side chains 43. The transverse member 40 is provided with lugs 44 which enter slots 46 in the sleeve-like links 42 to prevent the transverse member 40 from turning in the links 42 and it is also preferred to bevel the edges of the member 40 as at 47 to fit the cut out portions of the links 42. A washer 48 also provided with lugs 49 is placed on the outside of each link 42 and the whole is securely attached together by a bolt 50 washer 52 and nut 54. The links 42 of each side chain are connected by connecting links 56, 58 pivotally attached to the links 42 by pins 60 provided with heads 62 which fit into slots 64 in the ends of the connecting links 56, 58. The construction of the chain is such that the chain may be easily assembled by inserting the pin 60 in the slot 46, at the narrow or center portion thereof and then hooking the links 56, 58 over the heads 62, while the link 42 is at right angles to links 56, 58, fitting the heads 62 into slots 64 and thereafter drawing the links 56, 58 forward until the pin 60 engages the end of the slot 46. These links must be assembled before the transverse member 40 is attached to the side links 42, and when the structure is entirely assembled the liability of unintentional disengagement of the component parts thereof is minimized.

In the preferred form of the invention, the transverse members 40 are each of a design such that the cross bars thereof are disposed in alignment with the pins 60 and so that the fastening bolts 50 are positioned centrally of the links 42. In this manner it is possible to provide a construction of conveyer member in which a cross bar is disposed at each point of articulation while at the same time one fastening bolt 50 is disposed in every other link of the complete chain or conveyer. This construction lends itself particularly to use with those types of sprocket members over which the conveyer is designed to run, having one tooth for every other link of the conveyer or chain so that a simple and rugged fastener of the cross bars and the chain may be secured without interfering with the running of the chain over the sprocket.

From the above description of the preferred embodiment of the invention, it will be apparent that the present construction of conveying element is such as to facilitate assembly, whereby replacement of portions of the conveying element may be conveniently and economically effected, while insuring the maintenance of the conveyer in most efficient operating condition.

While the preferred embodiment of the invention has been herein illustrated and described, it will be understood that the invention may be embodied in other forms within the scope of the following claims.

Having thus described the invention, what is claimed is:

1. A conveying element comprising two spaced apart conveyer chains, each chain comprising a plurality of pivoted members, a plurality of open members extended transversely between said chains, and means for detachably connecting said open members to alternate opposed pairs of pivoted members including bolts extending through said chains and open members and nuts cooperating with the bolts, said open members having portions thereof disposed in alignment with the pivotal points of adjacent pivoted members.

2. A conveying element comprising two side chains spaced apart and each comprising a plurality of sleeves connected by interposed pairs of link members and pins removably inserted through the sleeves and detachably secured to said links and cross members of open structure detachably secured to said sleeves and with portions thereof disposed in alignment with said pins.

3. A conveying element comprising two spaced conveyer chains, each chain comprising a plurality of pivotally connected members, alternate members of each chain each comprising a pair of slotted links and the intermediate members of the chain comprising a hollow sleeve, detachable connections between the hollow sleeve and each pair of slotted links, cross members of open structure between said conveyer chains and connecting means extended through said sleeves for detachably securing the cross members to the chains, said open cross members having cross bars disposed in alignment with the pivotal points of adjacent link members.

4. A conveying element comprising two spaced conveyer chains, each chain comprising a plurality of pivoted members, alternate members of each chain comprising slotted links and intermediate members comprising hollow sleeves, a connecting member adapted to extend through the sleeve and link in one position to connect the sleeve to the link and incapable of such movement in normal operating positions, open cross members extended between the hollow sleeves and means for detachably connecting the cross members thereto, said cross members having portions thereof disposed in alignment with the pivotal points of adjacent pivoted members.

5. A conveying element comprising two spaced conveyer chains, each comprising a plurality of pivoted members, alternate members comprising sleeves, double headed pins extended through the sleeves and links to form a connection between them, cross members of open structure detachably connected to and disposed between the chains and having means cooperating with the sleeves for preventing relative movement of the cross members with relation thereto, said cross members having portions thereof disposed in alignment with said double headed pins.

6. A conveying element comprising two spaced conveyer members each having a plurality of pivoted link members, a series of cross members of open structure and each having at least two cross bars spaced apart, means for fastening successive cross bars to alternate links of each conveyer member, said cross members being of a size to dispose the cross bars substantially in alignment with the pivotal points between adjacent link members.

7. A conveying element comprising two spaced conveyer members each having a plurality of pivoted link members detachably secured together and adjacent links being capable of being detached from one another by lateral movement but only when moved into an abnormal angular position with relation to one another, a series of cross members of open structure secured to alternate links of said conveyer members and with portions of the cross members disposed in alignment with the pivotal points of adjacent link members.

8. A conveying element comprising two spaced conveyer chains and a plurality of open members disposed between the chains, each chain comprising a plurality of pivoted members said open members being detachably connected to alternate opposed pairs of pivoted members immediately adjacent the same and intermediate thereof, and having portions disposed in alignment with the pivotal points of said pivoted members.

ALFRED DE LOS SINDEN.